(12) United States Patent
Stevenson

(10) Patent No.: US 9,955,621 B2
(45) Date of Patent: May 1, 2018

(54) FRONT FOLD IMPLEMENT FRAME WITH PIVOTAL DRAFT LINK CONNECTION

(71) Applicant: Kinze Manufacturing, Inc., Williamsburg, IA (US)

(72) Inventor: Vaughan G. Stevenson, Williamsburg, IA (US)

(73) Assignee: Kinze Manufacturing, Inc., Williamsburg, IA (US)

( * ) Notice: Subject to any disclaimer, the term of this patent is extended or adjusted under 35 U.S.C. 154(b) by 196 days.

(21) Appl. No.: 14/272,640

(22) Filed: May 8, 2014

(65) Prior Publication Data
US 2015/0319912 A1 Nov. 12, 2015

(51) Int. Cl.
*A01B 73/06* (2006.01)
*A01B 59/00* (2006.01)

(52) U.S. Cl.
CPC ............ *A01B 59/00* (2013.01); *A01B 73/06* (2013.01); *A01B 73/065* (2013.01); *A01B 59/002* (2013.01)

(58) Field of Classification Search
CPC ..................................................... A01B 73/065
USPC ................................................. 172/311, 669
See application file for complete search history.

(56) References Cited

U.S. PATENT DOCUMENTS

| | | | | |
|---|---|---|---|---|
| 2,226,586 A | * | 12/1940 | Seaholm | A01B 21/08 172/240 |
| 4,066,274 A | * | 1/1978 | Adee | A01B 73/062 172/311 |
| 4,137,852 A | * | 2/1979 | Pratt | A01C 7/208 111/57 |
| 4,236,585 A | * | 12/1980 | Adee | A01B 73/067 172/311 |
| 4,364,581 A | * | 12/1982 | Shoup | A01B 73/065 172/311 |
| 4,518,046 A | * | 5/1985 | Rettig | A01B 73/065 172/311 |
| 4,721,167 A | * | 1/1988 | Salley | A01B 59/04 172/311 |
| 5,113,956 A | * | 5/1992 | Friesen | A01B 73/065 172/311 |
| 5,787,988 A | * | 8/1998 | Harlan | A01C 7/208 172/311 |

(Continued)

*Primary Examiner* — Thomas B Will
*Assistant Examiner* — Joel F. Mitchell
(74) *Attorney, Agent, or Firm* — McKee, Voorhees & Sease, PLC

(57) ABSTRACT

A forward folding agricultural implement frame has a center frame with pivotally connected wings that fold forward for storage and laterally for use. A pair of draft links connects the wings to a telescopic hitch that extends forward from the center frame. A pivot pin operably mounted to a forward portion of the telescopic hitch defines a generally vertical pivot axis. A pivot link is connected to the pivot pin to pivot about the generally vertical pivot axis. The pivot link having a first portion on one side of the pivot pin and a second portion on an opposite of the pivot pin from the first portion. The draft links are pivotally connected to the first and second portions of the pivot link. When the wings are flexed in opposite directions (or when one wing is neutral and the other wing is flexed), the pivot link will permit opposite relative movement of the draft link ends relative to the inner hitch, which reduces internal stress and prevents permanent strain of the components.

10 Claims, 8 Drawing Sheets

(56) References Cited

U.S. PATENT DOCUMENTS

| | | | |
|---|---|---|---|
| 6,902,010 B2 * | 6/2005 | Shoup | A01B 73/065 172/111 |
| 7,604,068 B1 * | 10/2009 | Friesen | A01B 73/065 172/311 |
| 7,849,933 B2 * | 12/2010 | Marggi | A01B 73/067 172/311 |
| 2013/0008360 A1 * | 1/2013 | Follmer | A01B 69/004 111/54 |
| 2013/0233580 A1 | 9/2013 | Kinzenbaw | |
| 2014/0000919 A1 | 1/2014 | Bachman et al. | |

* cited by examiner

FRONT FOLD IMPLEMENT FRAME WITH PIVOTAL DRAFT LINK CONNECTION

FIELD OF THE INVENTION

The present invention relates generally to the field of agricultural equipment. More particularly, but not exclusively, the invention relates to a front-folding implement frame with draft links connecting wing sections to a telescoping hitch.

BACKGROUND OF THE INVENTION

As the power of tractors and agricultural efficiency has increased, agricultural implements, such as planters have increased in span, or width, to accommodate larger numbers of individual row units. Large planters generally include a main frame having a forward hitch assembly for drawing by a tractor and left and right wing sections pivotally attached to a portion of the main frame. The pivoting wing connections allow the wings to fold relative to the main frame for transport and storage of the planter. Early planters pivotally displaced the wings vertically to reduce planter width and to provide clearance for transport through narrow spaces. However, as the size of planters has increased, planter wings are generally folded in a forward direction to accommodate longer planter wings or wing sections. This evolution has necessitated the incorporation of telescoping hitch assemblies and specific folding functions to accommodate planter wings of increased length. Examples of such forward folding planter frames are shown and described in Bachman, U.S. Patent Pub. No. 2014/0000919 and Kinzenbaw, U.S. Patent Pub. No. 2013/0233580, the contents of both of which are hereby incorporated by reference in their entireties.

According to current designs, a central frame is supported by wheels. Wings that are used to support agricultural equipment are pivotally connected to the central frame. Each of the wings is adjustable between a work position where it extends laterally from the central frame and a transport position wherein it is folded forward. A telescoping hitch extends forward from the central frame and is used to connect the implement to a towing vehicle, such as a tractor. Draft links connect the front (or inner) portion of the telescoping hitch with the wings. These draft links are pinned directly to the inner hitch on opposite sides of the hitch. According to one feature of these implements, a means is provided to apply a downward force between the center frame and wings in order to adjust the weight distribution on the wings. When the wings are pivoted downward relative to the central frame in the extended working position, they tend to pull the draft links, and therefore the front portion of the telescoping hitch, rearward towards the central frame; and when the wings are pivoted upward, they tend to push the front portion of the telescoping hitch forward towards the towing vehicle. This upward and downward pivoting of the wings can occur either because of applying weight distribution forces on the wings, or as a result of natural flexing of the wings as they move across uneven ground. When the wings flex in opposite directions, they work against each other, this can cause excess stress and ultimately permanent strain in the components.

Therefore, there is a need for an improved forward folding implement frame. The current invention relates to an improvement of a forward-folding implement frame that allows for a degree of movement between the draft links and the hitch without excess stress load on the frame such as might cause flexing and strain in the frame.

SUMMARY OF THE INVENTION

It is therefore a primary object, feature, or advantage of the present invention to overcome deficiencies in the art.

It is another object, feature, and/or advantage of the present invention to provide a system that will permit relative movement of the connection points of the draft links to the inner hitch.

In the present invention, the pivotal axes of the draft links are laterally spaced apart from each other on a pivot linkage mounted to the inner hitch portion. When the wings are flexed in the same direction (up or down), they work together to push or pull the inner hitch. However, when the wings are flexed in opposite directions (or when one wing is neutral and the other wing is flexed), the pivot linkage will permit opposite relative movement of the draft link ends relative to the front hitch portion, which reduces internal stress and prevents permanent strain of the components.

According to one embodiment the present invention is a forward folding implement that includes a central frame and a hitch extending forward from the central frame. The hitch has a rear portion supported by the central frame and a front portion extendably attached to the rear portion and adapted for connection to a towing vehicle. A first wing is pivotally connected to the central frame and is pivotal between a working position extending laterally from the central frame and a transport position extending forward from the central frame adjacent to the hitch. A second wing is pivotally connected to the central frame and is pivotal between a working position extending laterally from the central frame and a transport position extending forward from the central frame adjacent to the hitch. A pivot pin is mounted to the front portion of the hitch and defines a generally vertical pivot axis. A pivot link is pivotally connected to the pivot pin to pivot about the generally vertical pivot axis. The pivot link has a first portion on one side of the pivot pin and a second portion on an opposite of the pivot pin from the first portion. A first draft link is pivotally connected at a first end of the first draft link to the first wing and is pivotally connected at a second end of the first draft link to the first portion of the pivot link. A second draft link is pivotally connected at a first end of the second draft link to the second wing and is pivotally connected at a second end of the second draft link to the second portion of the pivot link. The hitch may have a telescopic tongue wherein the rear portion of the hitch has a hollow outer hitch member and the front portion of the hitch has an inner hitch member that is telescopically received within the outer hitch member. A pivot box may be secured to the inner hitch member, wherein the pivot pin is mounted within the pivot box. The first wing may have a first wing proximal portion and a first wing distal portion, with the first wing proximal portion being pivotally connected to the central frame by a generally vertically oriented first wing frame pivot member, and the first wing distal portion being pivotally connected to the first wing proximal portion by a generally horizontally oriented first wing distal pivot member. Similarly, the second wing may have a second wing proximal portion and a second wing distal portion, with the second wing proximal portion being pivotally connected to the central frame by a generally vertically oriented second wing frame pivot member, and the second wing distal portion being pivotally connected to the second wing proximal portion by a generally horizontally oriented second wing distal pivot member. The first draft link is connected to the first wing at the first wing distal portion. The second draft link is connected to the second wing at that second wing distal portion. The distal wing portions may be rotatable upward and downward with respect to their respective proximal wing portions around their respective distal pivot members, whereby upward rotation of either wing causes its draft link to urge the portion of the pivot link reward and downward rotation of either wing causes its draft link to urge the corresponding portion of the draft link forward.

These and/or other objects, features, and advantages of the present invention will be apparent to those skilled in the art. The present invention is not to be limited to or by these objects, features and advantages. No single embodiment need provide each and every object, feature, or advantage.

BRIEF DESCRIPTION OF THE DRAWINGS

The appended claims set forth those novel features, which characterize the invention. However, the invention itself, as well as further objects and advantages thereof, will best be understood by reference to the following detailed description of an embodiment taken in conjunction with the accompanying drawings, where like reference characters identify like elements throughout the various figures, in which:

Figure 1:
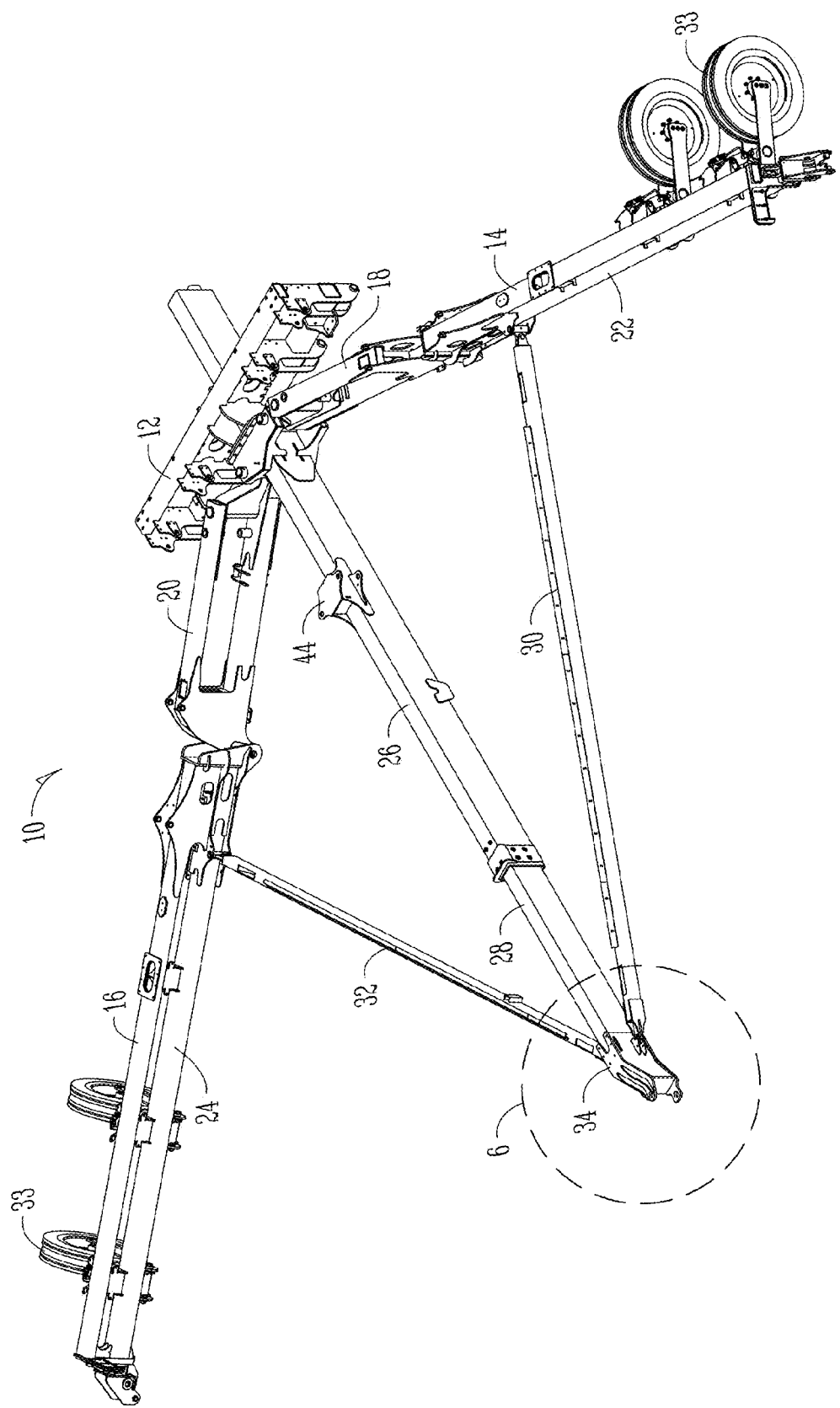
FIG. 1 is a perspective view of a forward folding implement frame with its wings partially folded between an extended working position and a folded transport position according to one embodiment of the present invention.

Before any independent features and embodiments of the invention are explained in detail, it is to be understood that the invention is not limited in its application to the details of the construction and the arrangement of the components set forth in the following description or illustrated in the drawings. The invention is capable of other embodiments and of being practiced or of being carried out in various ways. In addition, it is understood that the phraseology and terminology used herein is for the purpose of description and should not be regarded as limiting.

DETAILED DESCRIPTION OF THE PREFERRED EMBODIMENTS

FIG. 1 shows an embodiment of an implement frame 10. The frame 10 is shown without agricultural tools or extensions that are included when in use. The frame 10 includes a central frame 12. A first wing 14 and second wing 16 are pivotally connected to the central frame 12. Each of the wings 14 and 16 comprise a proximal wing section 18 and 20 and a distal wing section 22 and 24. An outer hitch member 26 extends forward from the central frame 12. The outer hitch member 26 is a hollow tube. An inner hitch member 28 is telescopically received within the outer hitch member 26. A pair of draft links 30 and 32 connects the wings 14 and 16 to the inner hitch member 28. The inner hitch member 28 includes a hitch 34 at its front end to permit attachment to a tractor or other towing vehicle. The wings 14 and 16 are supported by wheels 33.

As shown in FIG. 1, the wings 14 and 16 are partially folded forward towards a transport position. As the wings 14 and 16 pivot forward toward the transport position, the draft links 30 and 32 push the inner hitch member 28 forward to extend further out of the outer hitch member 26. As the wings 14 and 16 pivot rearward toward the working position, the draft links 30 and 32 pull the inner hitch member 28 rearward into the outer hitch member 26.

Figure 2:
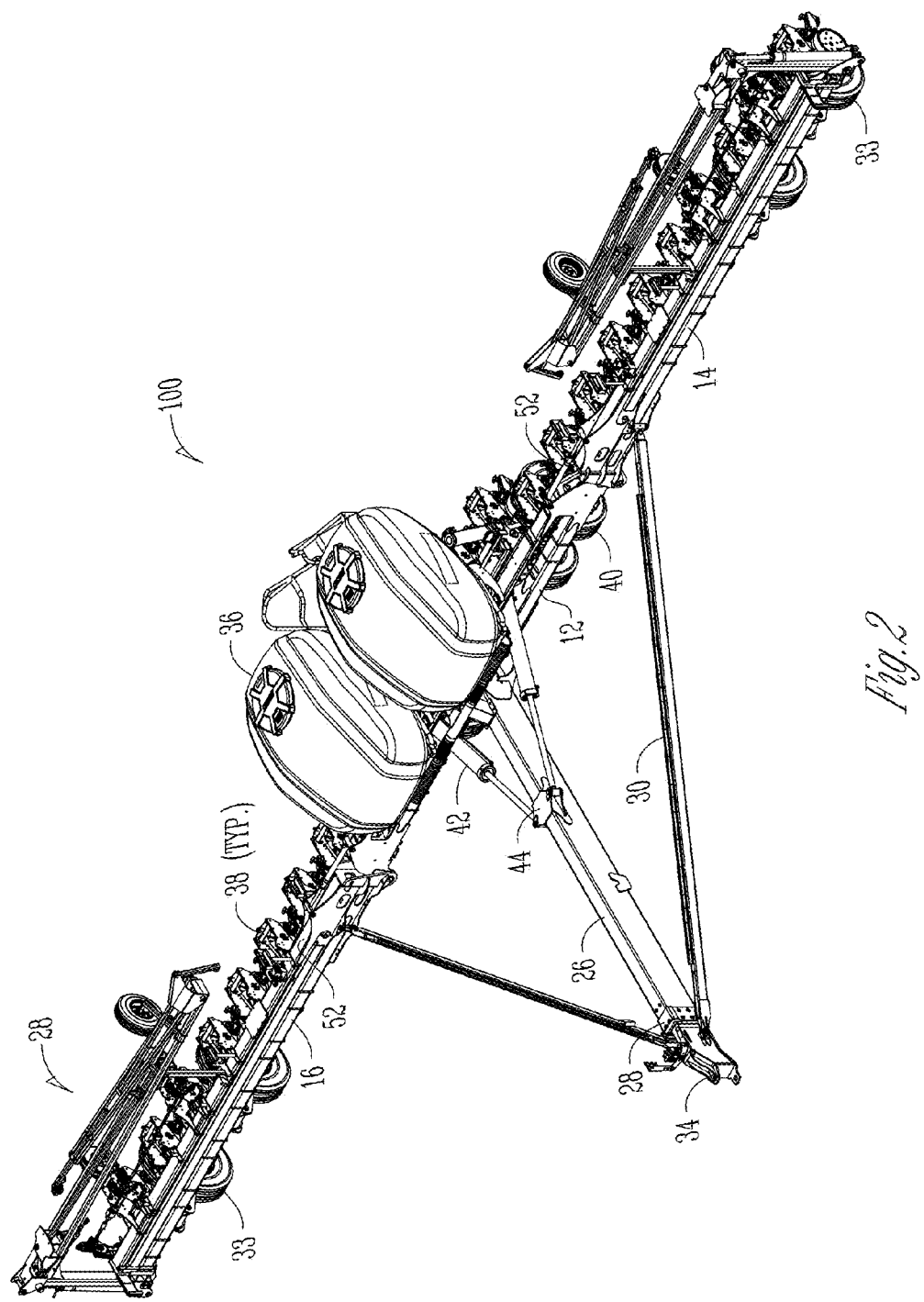
FIG. 2 is a perspective view of a forward folding agricultural implement including the implement frame of FIG. 1 with its wings in extended working positions according to one embodiment of the present invention.
Figure 3:
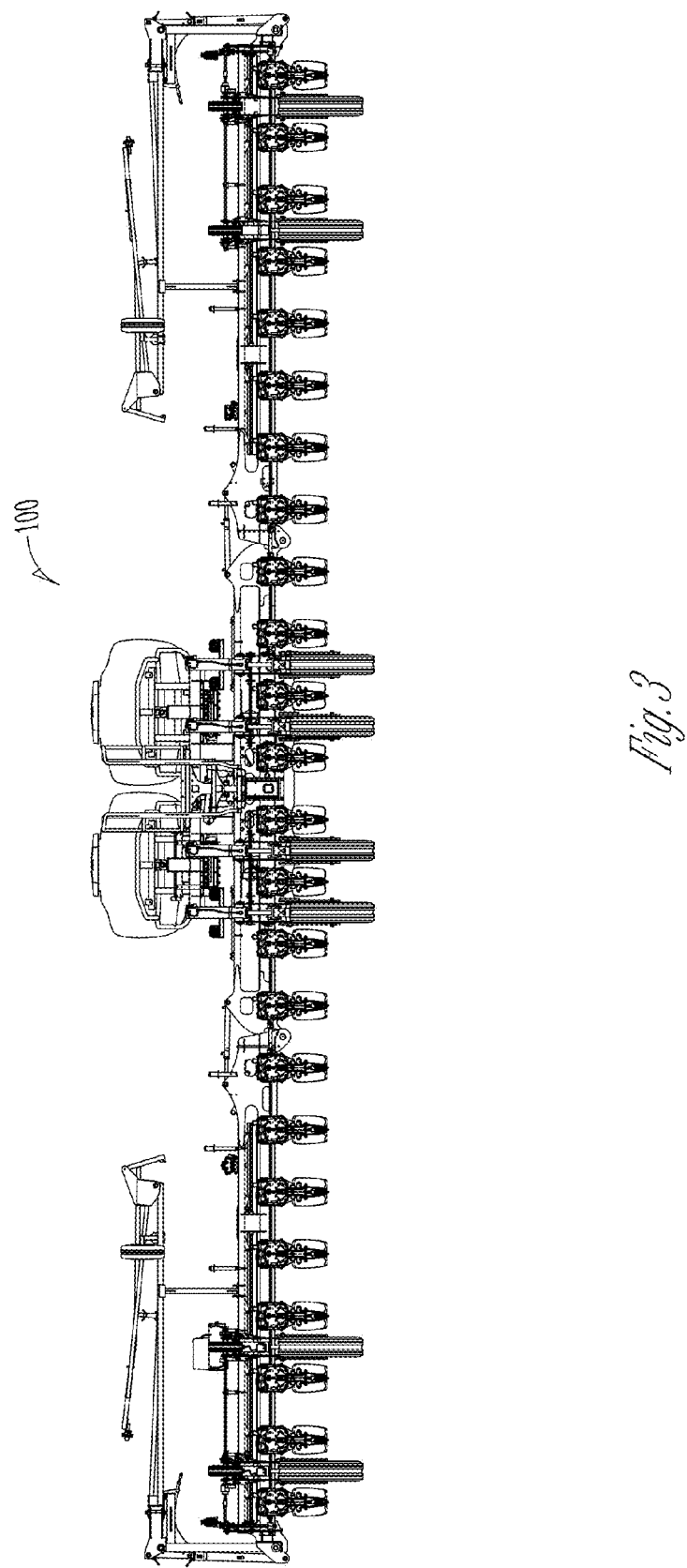
FIG. 3 is a rear elevation view of the implement of FIG. 1.
Figure 4:
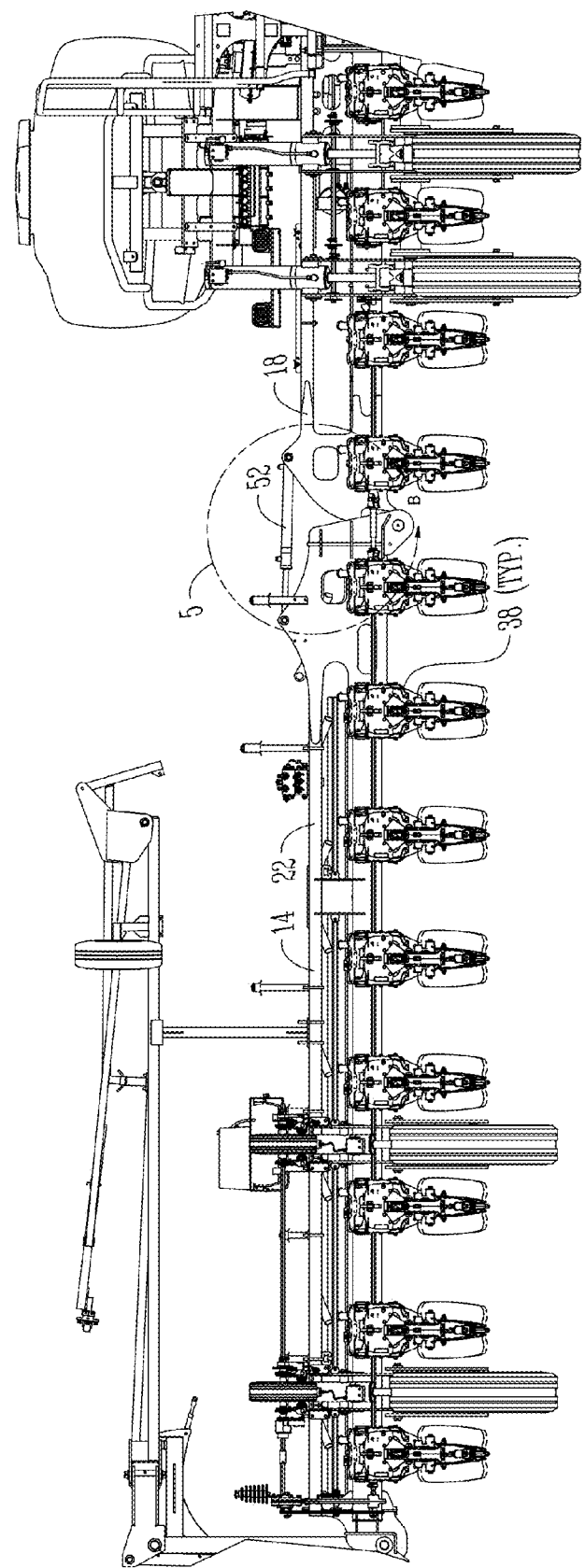
FIG. 4 is an enlarged view of a first wing from FIG. 2.

FIGS. 2-4 show an agricultural implement 100, in this case, a planter, on the implement frame 10. As shown in FIGS. 2-4, the wings 14 and 16 are in an extended working position. The implement 100 may be a planter, fertilizer, or the like, and is usually attached to and pulled by a tractor. However, it should be appreciated that other equipment and/or vehicles may move the implement 100. FIG. 3 shows a rear elevation view of the implement 100.

Central hoppers 36 are positioned at the central frame 12. The hoppers 36 are configured to store seed, fertilizer, insecticide, or other types of material for use in farming. The use of the central hoppers 36 allows for a large amount of material to be added in a centralized location. The central hoppers 36 are in fluid communication with row units 38. The row units 34 may be seeders, fertilizers, insecticide sprayers, or other dispensers, discs, or plows. Also connected to the central frame 12 is a plurality of central wheels 40 extending generally downwardly from the central frame 12. The wheels 40 contact the ground and support substantially the weight from the central hoppers 26. The wheels 40 stabilize the implement 100 and are the general wheels that contact the ground when in the transport position with the wings 14, 16 folded forward and the wing wheels 33 not contacting the ground.

Fold cylinders 42 are mounted between the wings 14, 16 and the outer hitch member 26. Specifically, the cylinders extend between the proximal wing sections 18, 20 and a mounting bracket 44 on the upper portion of the outer hitch member 26. The fold cylinders 42 are used to move the wings 14, 16 between the working position of FIGS. 2-4 and a transport position with the wings 14, 16 pulled forward adjacent to the hitch members 26, 28. Therefore, the fold cylinders 42 must be sufficiently strong to be able to move the wings 14, 16.

Figure 5:
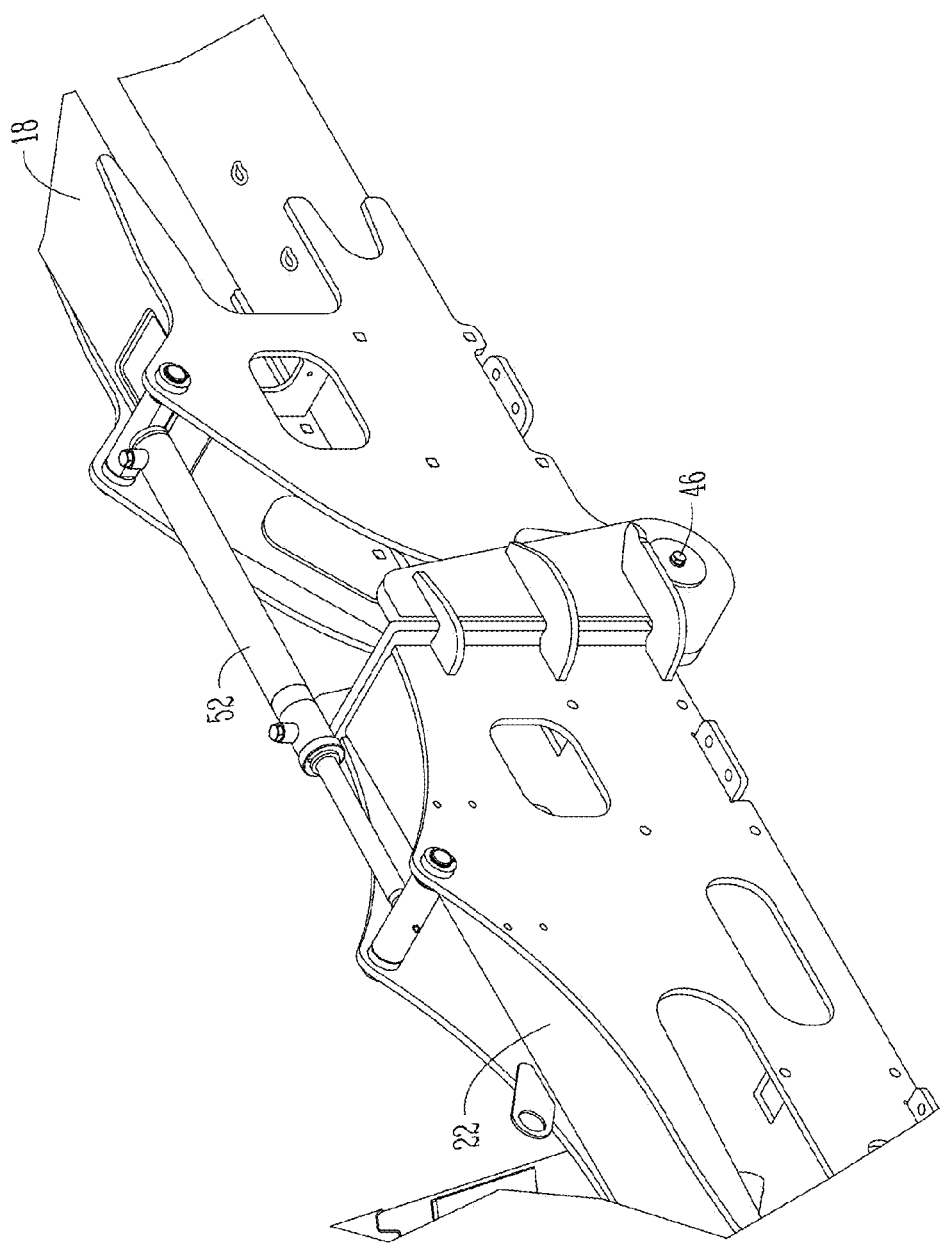
FIG. 5 is a partial detail perspective view of the joint between the central frame and the first wing of the forward folding implement of FIG. 1.

As best seen in FIGS. 4 and 5, the wings 14 and 16 may also include down force cylinders 52 to control the amount of down force applied to the row units 38. The down force cylinders are mounted between the proximal wing sections 18, 20 and the distal wing sections 22, 24. The down force cylinders 52 may provide a force to press the distal wing sections 22, 24 downwardly or the cylinders 52 may raise the distal wing sections 22, 24 to reduce ground contact pressure. The wings 14, 16 need to be lifted during turning or during the folding of the wings 14, 16. However, down force may be required to ensure that the row units 38 penetrate the ground or remain substantially engaged with the ground. It is contemplated that multiple down force cylinders be used with an implement having more sections.

As best seen in FIG. 5 (which shows a portion of the first wing 14, the second wing 16 includes similar structure), there is a wing pivot member 46 provided between the proximal wing section 18 and the distal wing section 22, that permits vertical pivoting of the distal wing section 22 relative to the proximal wing section 18.

In any event, during use, with the wings 14 and 16 in the extended working position of FIGS. 2-4, the wings 14, 16, and in particular the distal wing sections 22, 24, may flex upward and downward in response to forces transmitted to the wings 14, 16. The geometry of the implement 100 tends to be such that a downward flex of the distal wing sections 22, 24 pulls the draft links 30, 32 rearward, which in turn pulls the inner hitch 28 rearward. Conversely, an upward flex of the wings 14, 16 pushes the draft links 30, 32 forward, which in turn pushes the inner hitch 28 forward. Because the wings 14, 16 are spread over a large distance, the forces may be in opposite directions on the wings 14, 16 at any one time, such that the first wing 14 may be flexing upward as the second wings is flexing downward.

Figure 6:
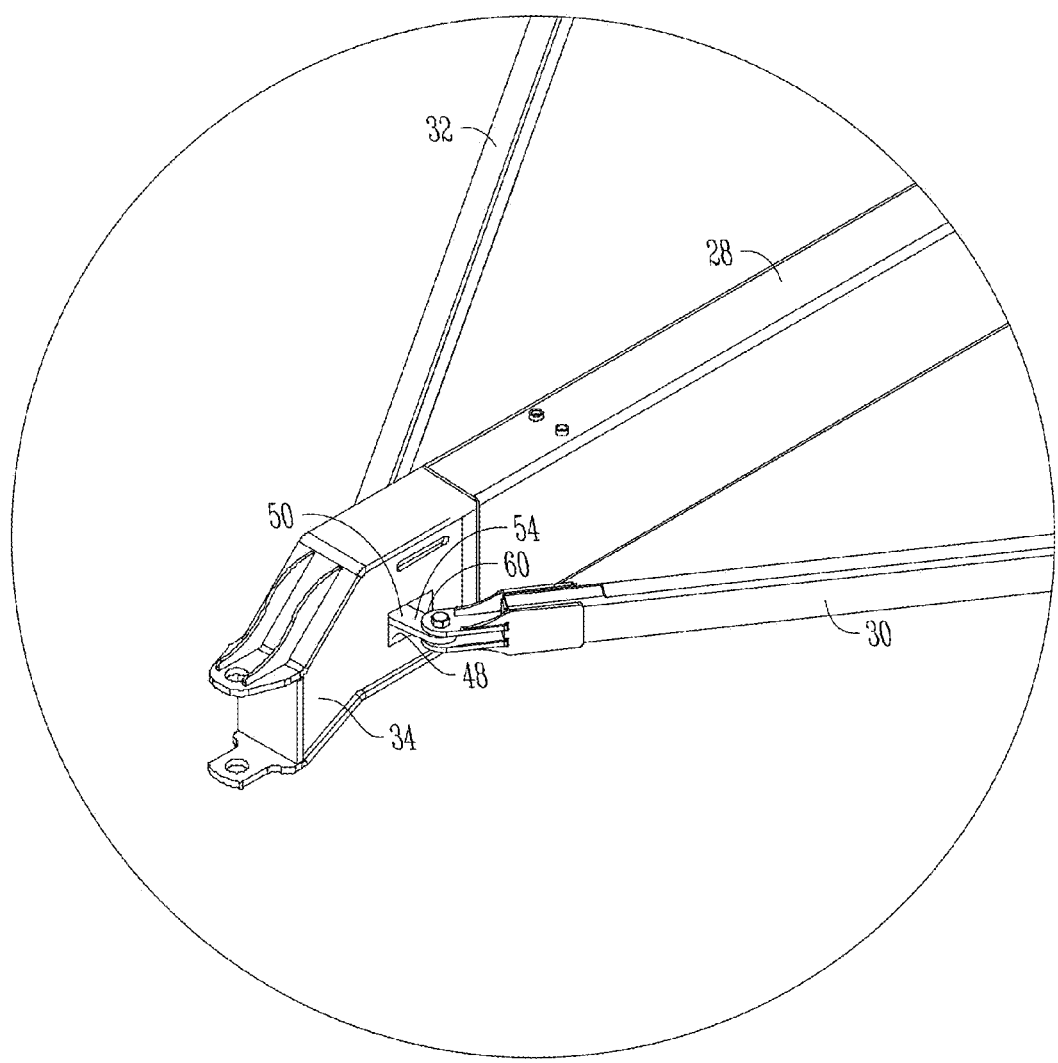
FIG. 6 is a partial enlarged perspective view from FIG. 1 of the connection between the draft links and a pivot link of the implement frame of FIG. 1.
Figure 7:
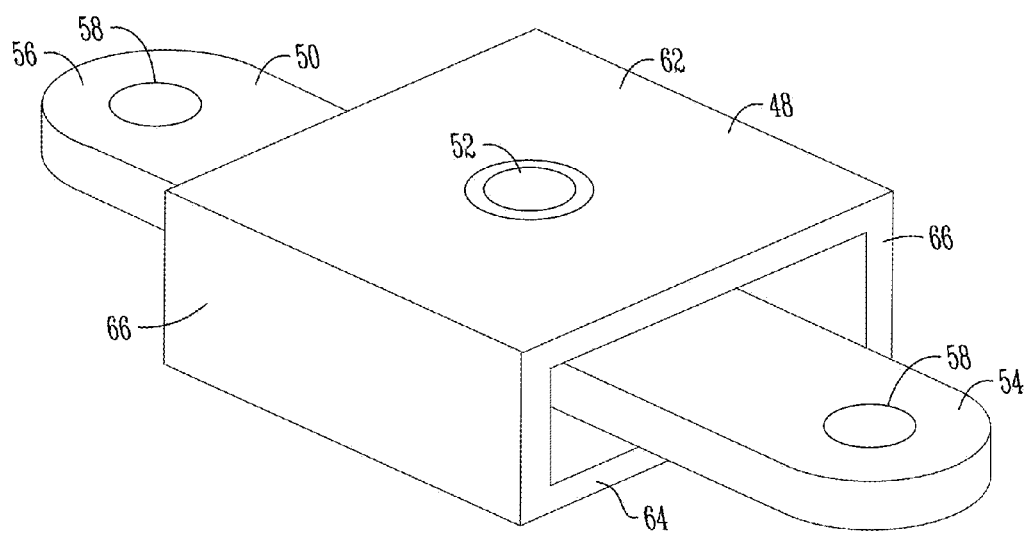
FIG. 7 is a perspective view of a pivot box with the pivot link in a neutral position, according to one embodiment of the present invention.

FIG. 6 shows the connection of the draft links 30, 32 to the hitch 34 on the inner hitch member 28. A pivot frame, in the form of pivot box 48 is secured in the hitch 34, for example by weldments. According to some aspects, the pivot frame 48 comprises a top plate 62, a bottom plate 64 and a pair of side plates 66 spanning between the top and bottom plate. A pivot link 50 is pivotally mounted in the pivot box 48. The pivot link 50 is rigid member that pivots generally at a central portion of the link 50 around pivot member 52 (see FIG. 7). The pivot link 50 may be a bolt, pin, or axle structure that is supported by the pivot box 48. The pivot link 50 has a first end portion 54 and a second end portion 56. Openings 58 are provided in the end portions 54, 56 and receive pivot pins 60 that pivotally connect the draft links 30, 32 to the pivot link 50. Specifically, the first draft link 30 attaches at the first end portion 54 and the second draft link 32 attaches at the second end portion 56.

Figure 8A:
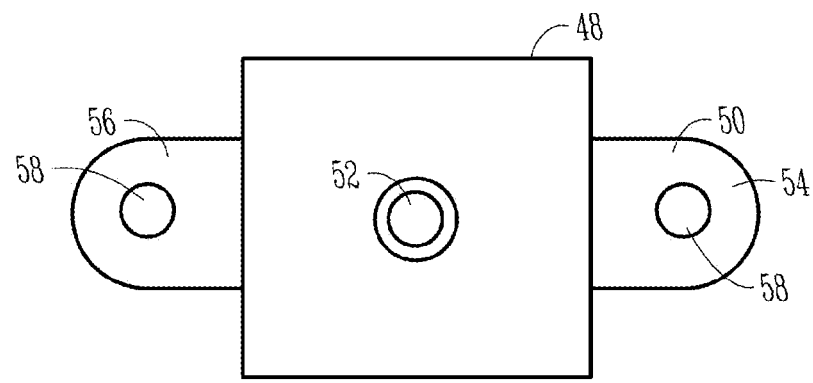
FIG. 8A is a top plan view of the pivot box of FIG. 7.
Figure 8B:
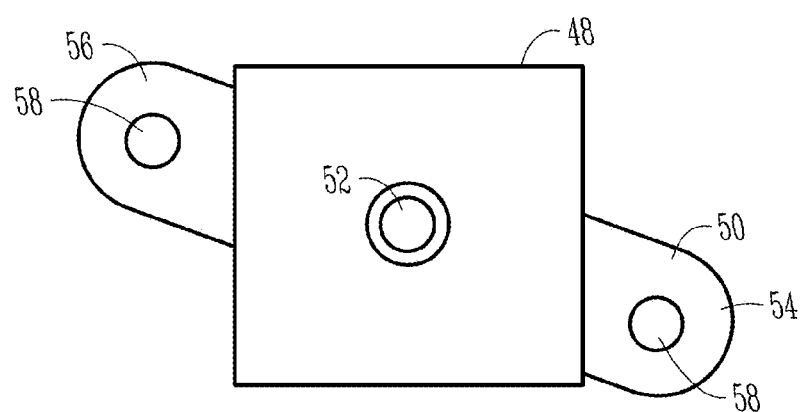
FIG. 8B is a top plan view of the pivot box of FIG. 8A, with the pivot link pivoted with a first portion moved forward and a second portion moved rearward.
Figure 8C:
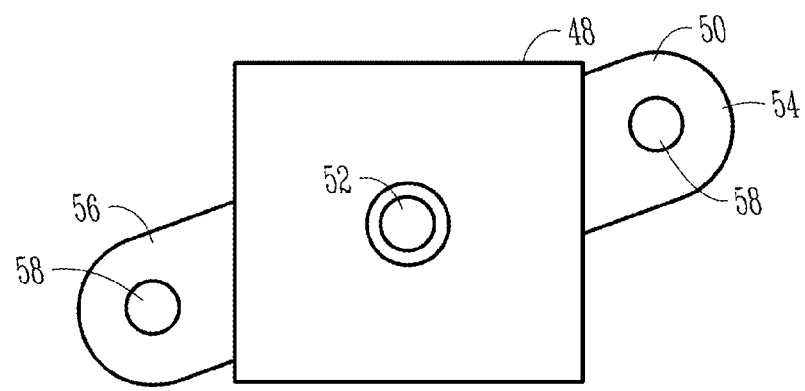
FIG. 8C is a top plan view of the pivot box of FIG. 8A, with the pivot link pivoted with the first portion moved rearward and the second portion moved forward.

The pivot link 50 allows for some play between the draft links 30, 32 and the hitch 34. This can alleviate stress that would otherwise be created by the flexing of the wings 14 and 16. For example, FIG. 8A shows the default neutral position of the pivot link 50. This position occurs when the wings 14 and 16 are in their extended working position and everything is square. If both of the wings 14 and 16 are flexed upward or downward by the same amount, the position of FIG. 8A will also be obtained. FIG. 8B shows the position of the pivot link 50 when the first wing 14 is flexed downward more than the second wing 16, such that the first draft link 30 tends to move forward. FIG. 8B also shows the position of the pivot link 50 when the second wing 16 is flexed upward more than the first wing 14. Therefore, in FIG. 8B, the first portion 54 of the link 50 is moved forward and the second portion 56 of the pivot link 50 is moved rearward. Similarly, FIG. 8C shows the position of the pivot link 50 when the second wing 16 is flexed downward more than the first wing 14, such that the second draft link 32 tends to move forward. FIG. 8C also shows the position of the pivot link 50 when the first wing 14 is flexed upward more than the second wing 16. Therefore, in FIG. 8C, the second portion 56 of the link 50 is moved forward and the first portion 54 of the pivot link 50 is moved rearward.

The pivotal axes of the draft links 30, 32 are laterally spaced apart from each other on the opposite portions 54, 56 of the pivot link 50 mounted to the inner hitch 28. When the wings 14, 16 are flexed in the same direction (up or down), they work together to push or pull the inner hitch 28. However, when the wings 14, 16 are flexed in opposite directions (or when one wing is neutral and the other wing is flexed), the pivot link 50 will permit opposite relative movement of the draft link ends relative to the inner hitch 28, which reduces internal stress and prevents permanent strain of the components.

Therefore, a front fold implement frame with pivotal draft link connection and method of use has been disclosed. The present invention contemplates numerous variations, options, and alternatives, and is not to be limited to these specific embodiments described herein. For example, the configuration of the wings and the tools provided on the wings may be changed to suit the intended use. Other changes are considered to be part of the present invention.

What is claimed is:

1. A forward folding implement including:
a central frame;
a tongue extending forward from the central frame, the tongue having a proximate end attached to the central frame and a distal end attached to a hitch adapted for connection to a towing vehicle;
a first wing pivotally connected to the central frame and being pivotal between a working position extending laterally from the central frame and a transport position extending forwardly from the central frame adjacent to the tongue;
a second wing pivotally connected to the central frame and being pivotal between a working position extending laterally from the central frame and a transport position extending forwardly from the central frame adjacent to the tongue;
a pivot pin mounted to the distal end of the tongue, the pivot pin defining a generally vertical pivot axis;
a pivot link pivotally connected to the pivot pin to pivot about the generally vertical pivot axis, the pivot link having a first portion on one side of the pivot pin and a second portion on an opposite side of the pivot pin from the first portion;
a first draft link pivotally connected at a first end of the first draft link to the first wing and pivotally connected at a second end of the first draft link to the first portion of the pivot link; and
a second draft link pivotally connected at a first end of the second draft link to the second wing and pivotally connected at a second end of the second draft link to the second portion of the pivot link;
wherein the pivot link is configured such that the pivot link has:
a first, neutral position occurring when the first wing and the second wing are flexed upward or downward by an equal amount;
a second position wherein the first portion of the pivot link is moved forward and the second portion of the pivot link is moved rearward occurring when the first wing is flexed downward more than the second wing or the second wing is flexed upward more than the first wing; and
a third position wherein the second portion of the pivot link is moved forward and the first portion of the pivot link is moved rearward occurring when the first wing is flexed upward more than the second wing or the second wing is flexed downward more than the first wing.

2. The forward folding implement of claim 1, wherein the tongue is a telescopic tongue comprising a hollow outer tongue member extending from the proximate end of the tongue towards the distal end of the tongue, and an inner tongue member that is telescopically received within the outer tongue member.

3. The forward folding implement of claim 2, wherein a pivot frame is secured to the inner tongue member at the distal end of the tongue, and further wherein the pivot pin is mounted within the pivot frame.

4. The forward folding implement of claim 3, wherein the pivot frame comprises
   a top plate;
   a bottom plate; and
   a pair of side plates spanning between the top and bottom plate; and
   wherein the pivot pin is supported by the top and bottom plates.

5. The forward folding implement of claim 1, wherein:
   the first wing comprises a first wing proximal portion and a first wing distal portion, the first wing proximal portion being pivotally connected to the central frame by a generally vertically oriented first wing frame pivot member, and the first wing distal portion being pivotally connected to the first wing proximal portion by a generally horizontally oriented first wing distal pivot member;
   the second wing comprises a second wing proximal portion and a second wing distal portion, the second wing proximal portion being pivotally connected to the central frame by a generally vertically oriented second wing frame pivot member, and the second wing distal portion being pivotally connected to the second wing proximal portion by a generally horizontally oriented second wing distal pivot member;
   the first draft link is connected to the first wing at the first wing distal portion;
   the second draft link is connected to the second wing at that second wing distal portion; and
   the distal wing portions are rotatable upward and downward with respect to their respective proximal wing portions around their respective distal pivot members, whereby upward rotation of either distal wing portion causes its corresponding draft link to urge its corresponding portion of the pivot link rearward and downward rotation of either wing causes its corresponding draft link to urge its corresponding portion of the draft link forward.

6. A draft link connector for attaching a pair of draft links to a hitch member of a forward folding agricultural implement, the draft link connector comprising:
   a pivot frame adapted to be secured to a hitch member of a forward folding agricultural implement;
   said hitch member attached to a tongue of the forward folding agricultural implement opposite a central toolbar;
   a pivot pin mounted to the pivot frame, the pivot pin defining a generally vertical pivot axis;
   a pivot link pivotally connected to the pivot pin to pivot about the generally vertical pivot axis, the pivot link having a first portion on one side of the pivot pin and a second portion on an opposite side of the pivot pin from the first portion;
   a first opening in the first portion of the pivot link for receiving a first pivot member to pivotally connect a first draft link to the pivot link; and
   a second opening in the second portion of the pivot link for receiving a second pivot member to pivotally connect a second draft link to the pivot link;
   wherein the pivot link has:
      a first, neutral position;
      a second position wherein the first portion of the pivot link is moved forward and the second portion of the pivot link is moved rearward; and
      a third position wherein the second portion of the pivot link is moved forward and the first portion of the pivot link is moved rearward.

7. The draft link connector of claim 6, wherein the pivot frame comprises:
   a top plate;
   a bottom plate; and
   a pair of side plates spanning between the top and bottom plate; and
   wherein the pivot pin is supported by the top and bottom plates.

8. An agricultural implement frame comprising:
   a center frame;
   a pair of wings foldably connected to the center frame;
   a first draft link and a second draft link connecting the wings to a distal end of a telescoping hitch:
   a pivot frame secured to the distal end of the telescoping hitch;
   a pivot pin mounted to the pivot frame, the pivot pin defining a generally vertical pivot axis;
   a pivot link pivotally connected to the pivot pin to pivot about the generally vertical pivot axis, the pivot link having a first portion on one side of the pivot pin and a second portion on an opposite side of the pivot pin from the first portion;
   a first pivot member connecting the first draft link to the first portion of the pivot link;
   a second pivot member connecting the second draft link to the second portion of the pivot link; and
   wherein the pivot link is configured such that the pivot link has:
      a first, neutral position occurring when the pair of wings are flexed upward or downward by an equal amount;
      a second position wherein the first portion of the pivot link is moved forward and the second portion of the pivot link is moved rearward occurring when one of the pair of wings is flexed upward more than the other wing of the pair of wings; and
      a third position wherein the second portion of the pivot link is moved forward and the first portion of the pivot link is moved rearward occurring when the one of the pair of wings is flexed downward more than the other wing of the pair of wings.

9. The agricultural implement frame of claim 8, wherein the pivot frame comprises
   a top plate;
   a bottom plate; and
   a pair of side plates spanning between the top and bottom plate; and
   wherein the pivot pin is supported by the top and bottom plates.

10. The agricultural implement frame of claim 8, wherein:
   a first wing of the pair of wings comprises a first wing proximal portion and a first wing distal portion, the first wing proximal portion being pivotally connected to the central frame by a generally vertically oriented first wing frame pivot member, and the first wing distal portion being pivotally connected to the first wing proximal portion by a generally horizontally oriented first wing distal pivot member;
   a second wing of the pair of wings comprises a second wing proximal portion and a second wing distal portion, the second wing proximal portion being pivotally connected to the central frame by a generally vertically oriented second wing frame pivot member, and the second wing distal portion being pivotally connected to the second wing proximal portion by a generally horizontally oriented second wing distal pivot member;

the first draft link is connected to the first wing at the first wing distal portion;

the second draft link is connected to the second wing at that second wing distal portion; and the distal wing portions are rotatable upward and downward with respect to their respective proximal wing portions around their respective distal pivot members, whereby upward rotation of either distal wing portion causes its corresponding draft link to urge its corresponding portion of the pivot link rearward and downward rotation of either wing causes its corresponding draft link to urge its corresponding portion of the draft link forward.

\* \* \* \* \*